(12) United States Patent
Hyoudou et al.

(10) Patent No.: US 9,755,930 B2
(45) Date of Patent: Sep. 5, 2017

(54) NETWORK SWITCH, NETWORK SYSTEM, AND NETWORK CONTROL METHOD

(71) Applicant: FUJITSU LIMITED, Kawasaki-shi, Kanagawa (JP)

(72) Inventors: Kazuki Hyoudou, Chofu (JP); Yukihiro Nakagawa, Kawasaki (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 14/551,257

(22) Filed: Nov. 24, 2014

(65) Prior Publication Data

US 2015/0222509 A1 Aug. 6, 2015

(30) Foreign Application Priority Data

Feb. 3, 2014 (JP) ................. 2014-018282

(51) Int. Cl.
*G06F 9/45* (2006.01)
*H04L 12/26* (2006.01)
*H04L 12/935* (2013.01)

(52) U.S. Cl.
CPC ...... *H04L 43/0817* (2013.01); *H04L 49/3009* (2013.01)

(58) Field of Classification Search
None
See application file for complete search history.

(56) References Cited

U.S. PATENT DOCUMENTS

| 2003/0187915 A1* | 10/2003 | Sun ................. H04L 29/06 709/201 |
| 2010/0107162 A1* | 4/2010 | Edwards ........... G06F 9/5077 718/1 |
| 2012/0014386 A1* | 1/2012 | Xiong ............. H04L 29/12028 370/392 |
| 2012/0278807 A1 | 11/2012 | Nakagawa |
| 2012/0278888 A1* | 11/2012 | Lin .................. H04L 12/66 726/23 |
| 2013/0155906 A1* | 6/2013 | Nachum ........... H04L 61/103 370/255 |

(Continued)

FOREIGN PATENT DOCUMENTS

| JP | 2008017315 A | * 1/2008 | ...... H04L 12/4625 |
| JP | 2010-124129 | 6/2010 | |

(Continued)

*Primary Examiner* — Xavier Szewai Wong
(74) *Attorney, Agent, or Firm* — Staas & Halsey LLP

(57) ABSTRACT

A network switch, includes: a port configured to receive a packet from one of a first information processing device and a second information processing device: a processor configured to process the packet, wherein the processor performs operations of: extracting first information which is used for creating a request packet requesting a response of a first virtual machine executed by the first information processing device from the packet which is transmitted by the first virtual machine to a second virtual machine executed by the second information processing device; creating the request packet using the first information; transmitting the request packet to the first virtual machine; and determining an operation state of the first virtual machine based on if a response packet for the request packet is received from the first virtual machine.

16 Claims, 19 Drawing Sheets

(56) References Cited

U.S. PATENT DOCUMENTS

| | | | | |
|---|---|---|---|---|
| 2014/0064104 A1* | 3/2014 | Nataraja | ............... | H04L 61/103 |
| | | | | 370/248 |
| 2014/0105213 A1* | 4/2014 | A K | ........................ | H04L 45/74 |
| | | | | 370/392 |
| 2015/0052522 A1* | 2/2015 | Chanda | ................... | G06F 9/455 |
| | | | | 718/1 |

FOREIGN PATENT DOCUMENTS

| | | |
|---|---|---|
| JP | 2011-146002 | 7/2011 |
| JP | 2014-120911 | 6/2014 |

* cited by examiner

FIG. 5

| INPUT PORT | CONDITIONS | | | | | PROCESSING |
|---|---|---|---|---|---|---|
| | DESTINATION MAC ADDRESS | TRANSMISSION SOURCE MAC ADDRESS | VLAN ID | ETHER TYPE | OTHER FIELD | |
| ... | ... | ... | ... | ... | ... | ... |
| ALL PORTS | ff:ff:ff:ff:ff:ff | Don't Care | | 0x0806 | Don't Care | Copy to CPU |
| ... | ... | ... | ... | ... | ... | ... |

FIG. 6

| MAC ADDRESS | PROFILE ID | PORT TO WHICH PROFILE IS APPLIED | STATE | CONFIRMATION PACKET | CORRESPONDING IP ADDRESS | VLAN ID |
|---|---|---|---|---|---|---|
| VM1-MAC | 1 | 1 | SUSPEND | ENABLE | VM1-IP | 10 |
| VM2-MAC | 2 | 1 | ASSIGN | ENABLE | VM2-IP | 20 |
| ... | ... | ... | ... | ... | ... | ... |
| VMn-MAC | m | – | NOT ASSIGN | DISABLE | – | |

FIG. 7

| ARP REQUEST | SET VALUES |
|---|---|
| DESTINATION MAC ADDRESS | ff:ff:ff:ff:ff:ff |
| TRANSMISSION SOURCE MAC ADDRESS | MAC ADDRESS OF VM 1 |
| VLAN TAG | 0×8100 |
| VLAN ID | VLAN ID OF VM 1 |
| TRANSMISSION SOURCE MAC ADDRESS | MAC ADDRESS OF VM 1 |
| TRANSMISSION SOURCE IP ADDRESS | IP ADDRESS OF VM 1 |
| TARGET MAC ADDRESS | 00:00:00:00:00:00 |
| TARGET IP ADDRESS | ARP TARGET IP ADDRESS |

FIG. 8

| ARP REQUEST | SET VALUES |
|---|---|
| DESTINATION MAC ADDRESS | MAC ADDRESS OF VM 1 |
| TRANSMISSION SOURCE MAC ADDRESS | MAC ADDRESS OF SWITCH DEVICE |
| VLAN TAG | 0×8100 |
| VLAN ID | VLAN ID OF VM 1 |
| TRANSMISSION SOURCE MAC ADDRESS | ff:ff:ff:ff:ff:ff |
| TRANSMISSION SOURCE IP ADDRESS | 0.0.0.0 |
| TARGET MAC ADDRESS | 00:00:00:00:00:00 |
| TARGET IP ADDRESS | IP ADDRESS OF VM 1 |

FIG. 16

| MAC ADDRESS | PROFILE ID | PORT TO WHICH PROFILE IS APPLIED | STATE | PROBE | CORRESPONDING IP ADDRESS | VLAN ID |
|---|---|---|---|---|---|---|
| VM1-MAC | 1 | 222 | SUSPEND | ENABLE | 192.168.1.1 | 20 |
| VM2-MAC | 2 | 111 | ASSIGN | ENABLE | VM2-IP | 20 |
| ... | ... | ... | ... | ... | ... | ... |
| VMn-MAC | m | – | NOT ASSIGN | DISABLE | – | |

FIG. 17

| MEMORY ADDRESS | VLAN ID | MAC ADDRESS | PORT VECTOR | TIMER | REMAINING NUMBER OF TIMES | STATE OF CONFIRMATION PACKET |
|---|---|---|---|---|---|---|
| 1 | 10 | 00:01:02:03:04:05 | 0x000000001 | 30 | 3 | ACTIVE |
| 2 | 20 | 00:01:02:03:04:06 | 0x000000002 | 5 | 2 | PROBING |
| 3 | 1 | 00:01:02:03:04:07 | 0x000000010 | 0 | 0 | DISABLE |
| ... | ... | ... | ... | ... | ... | ... |
| N | 30 | 00:01:02:03:04:xx | 0x000000100 | 20 | 3 | ACTIVE |

NETWORK SWITCH, NETWORK SYSTEM, AND NETWORK CONTROL METHOD

CROSS-REFERENCE TO RELATED APPLICATION

This application is based upon and claims the benefit of priority of the prior Japanese Patent Application No. 2014-018282, filed on Feb. 3, 2014, the entire contents of which are incorporated herein by reference.

FIELD

The embodiments discussed herein are related to a network switch, a network system, and a network control method.

BACKGROUND

With the server virtualization technology, migration and the like of a virtual machine (for example, migration, creation, and deletion of a virtual machine) are performed without depending on an arrangement of a physical server. When the migration and the like of a virtual machine are performed, resetting of a physical switch of a network is performed in order for the virtual machine relating the migration and the like to perform communications.

A related technology is disclosed in Japanese Laid-open Patent Publication No. 2011-146002 and Japanese Laid-open Patent Publication No. 2014-120911.

SUMMARY

According to an aspect of the embodiments, a network switch, includes: a port configured to receive a packet from one of a first information processing device and a second information processing device: a processor configured to process the packet, wherein the processor performs operations of: extracting first information which is used for creating a request packet requesting a response of a first virtual machine executed by the first information processing device from the packet which is transmitted by the first virtual machine to a second virtual machine executed by the second information processing device; creating the request packet using the first information; transmitting the request packet to the first virtual machine; and determining an operation state of the first virtual machine based on if a response packet for the request packet is received from the first virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of an access control list;
FIG. 6 illustrates an example of data in a profile DB;
FIG. 7 illustrates an example of a value in an ARP request;
FIG. 8 illustrates an example of a value in a confirmation packet;
FIG. 16 illustrates an example of relay processing;
FIG. 17 illustrates an example of data in an FDB.

DESCRIPTION OF EMBODIMENTS

Figure 1:
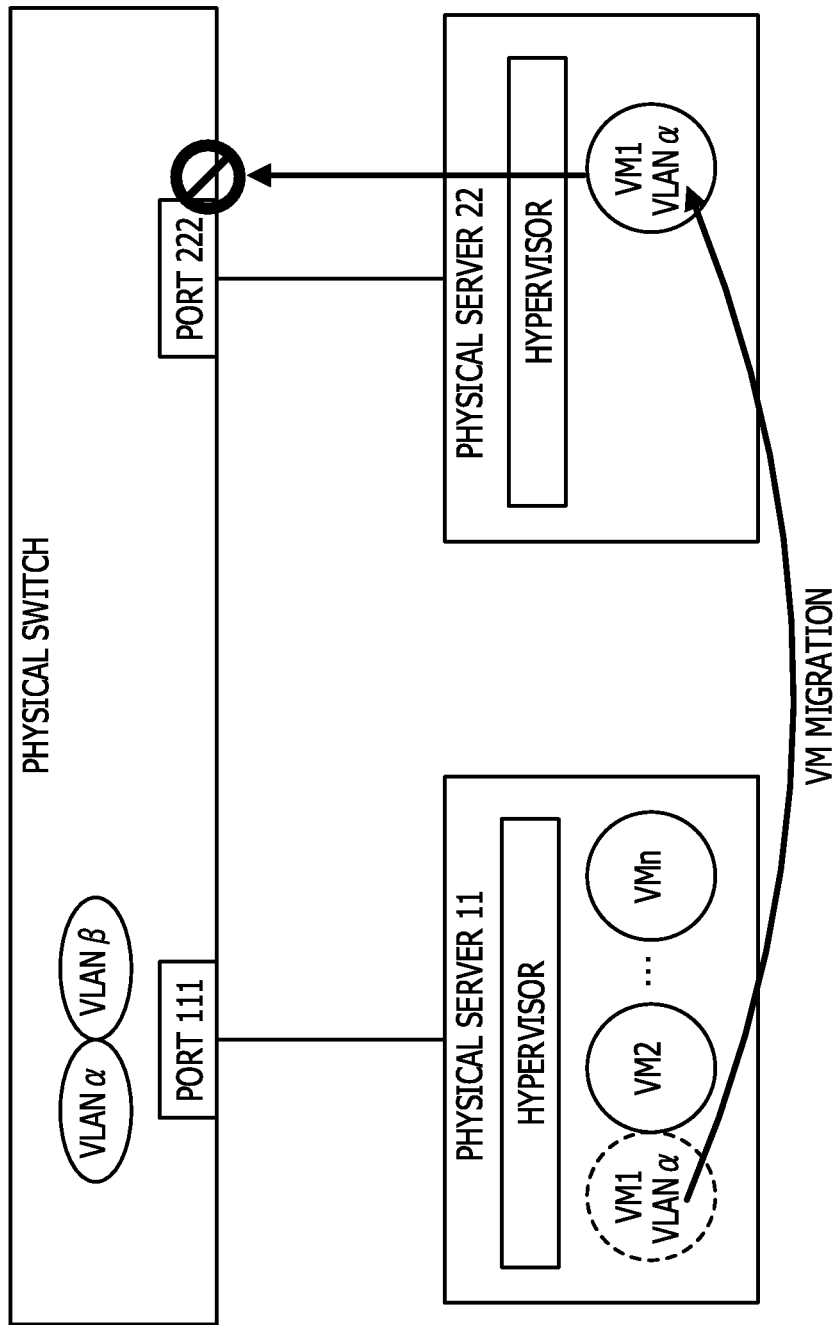
FIG. 1 illustrates an example of a system.

FIG. 1 illustrates an example of a system. In the system illustrated in FIG. 1, a virtual machine moves with live migration. A physical server 11 is coupled to a physical switch port 111 and a physical server 22 is coupled with a physical switch port 222. A virtual local area network (VLAN) α and VLAN β are set in the physical switch port 111. Virtual machines (VMs) 1 to n are executed on a hypervisor in the physical server 11 and a VM is not executed in the physical server 22 in a state before the VM 1 moves. The VM 1 may belong to the VLAN α.

For example, the VM 1 moves from the physical server 11 to the physical server 22 with live migration. The VM 1 transmits a packet for performing communications with a VM in the physical server 11 in the physical server 22 in a move destination. The packet transmitted by the VM 1 is received by the physical switch port 222. However, the VLAN α is not set in the port 222. Accordingly, there is a possibility that the physical switch does not relay the packet received from the VM 1.

For example, in updating the setting in conjunction with the migration of the virtual machine, when a physical port of a server in a move destination does not belong to the VLAN which is used by the VM, the management server configured to manage the migration of the VM performs control so as to allow the physical port of the server in the move destination to use the VLAN. For example, when the VLAN which is used by the VM in a server in a move source is not used by other VM which is executed in the server in the move source, the management server performs control so that the VLAN used by the VM is not used by the physical port of the server in the move source. For example, to update the configuration in conjunction with the migration of the virtual machine (VM), the physical switch detects the migration of the VM. For example, the physical switch may use the VM's identifier within the received packets transmitted from the VM. The VM's identifier may include a MAC address, for example. When the physical switch detects a new VM in the first time or detects the VM, which has been detected already, on another port which is different from the port in which the VM has been detected before, the switch determines the new VM is created in or the VM moves to the server coupled to another port. In this case, when another port coupled to the server in the move destination does not belong to the VLAN which is used by the VM, the physical switch sets the VLAN to another port. When the VLAN is not used by other VMs executed in the server in the move source, the switch unsets the VLAN from the port coupled to the server in the move source. For example, the switch automatically sets the configuration to another port by detecting the migration of the VM so that the moved VM continues to use VLAN and the relay of unnecessary packets to the server in the move source is reduced.

Figure 2:
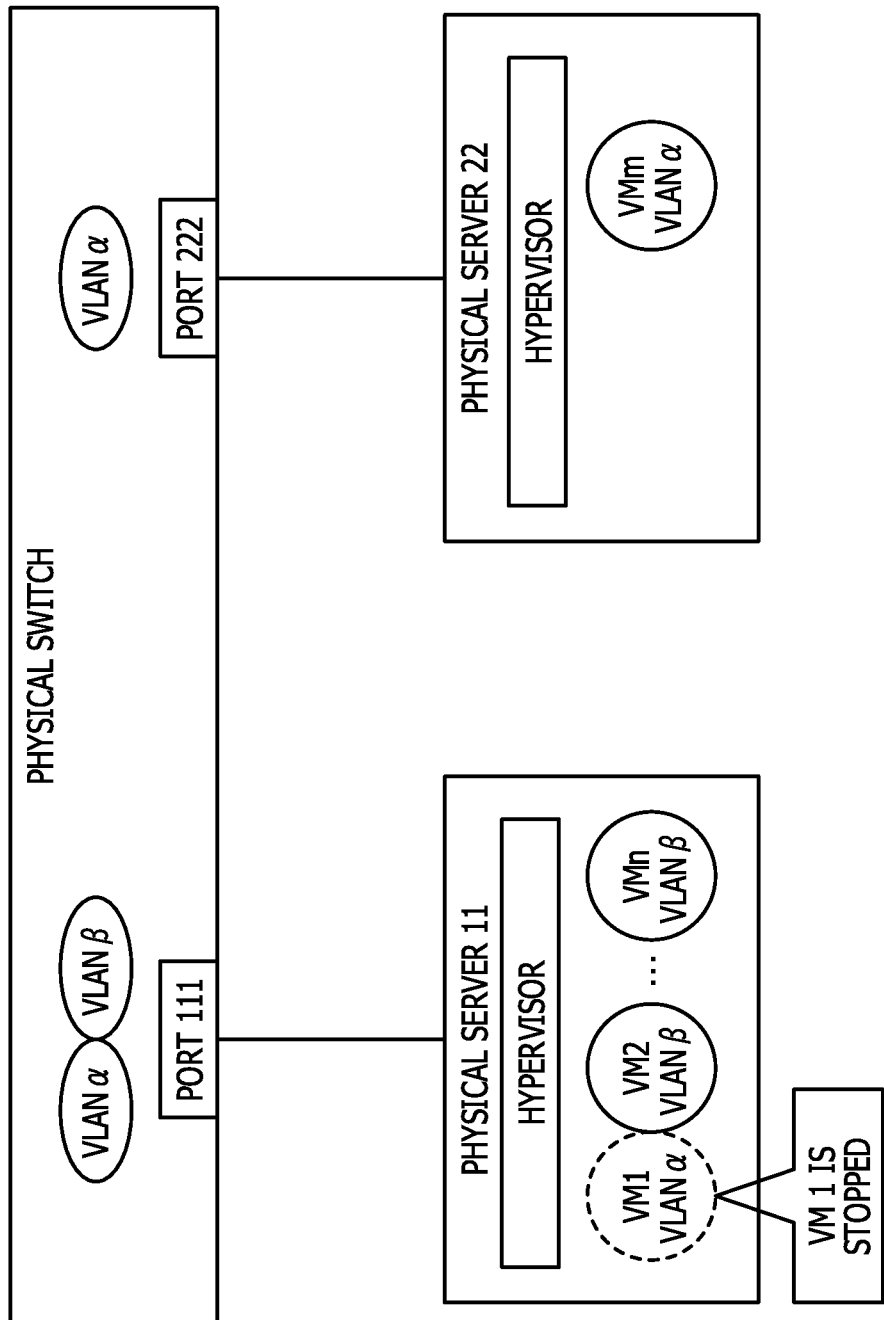
FIG. 2 illustrates an example of a system.

In this case, the migration of the VM may be targeted and the stop of the VM may not be targeted. FIG. 2 illustrates an example of a system. In the system illustrated in FIG. 2, the physical server 11 is coupled with the physical switch port 111 and the physical server 22 is coupled with the physical switch port 222. The VLAN α and VLAN β are set in the physical switch port 111. The VLAN α is set in the physical switch port 222. In a state before the VM 1 stops, the VMs 1 to n are executed on the hypervisor in the physical server 11 and a VM m is executed on the hypervisor in the physical server 22. The VM 1 and the VM m may belong to the VLAN α and the VM 2 and the VM n may belong to the VLAN β.

For example, it is assumed that the VM 1 is stopped. There is no VM belonging to the VLAN α in the physical server 11. Accordingly, there may be a problem of security if packets transmitted by the VM m are transferred to the physical server 11. Since the physical switch does not detect that the VM 1 is stopped, there may be a case where the setting of the VLAN α in the port 111 is not deleted. For this reason, there is a possibility that the packets transmitted by the VM m are transferred to the physical server 11.

Figure 3:
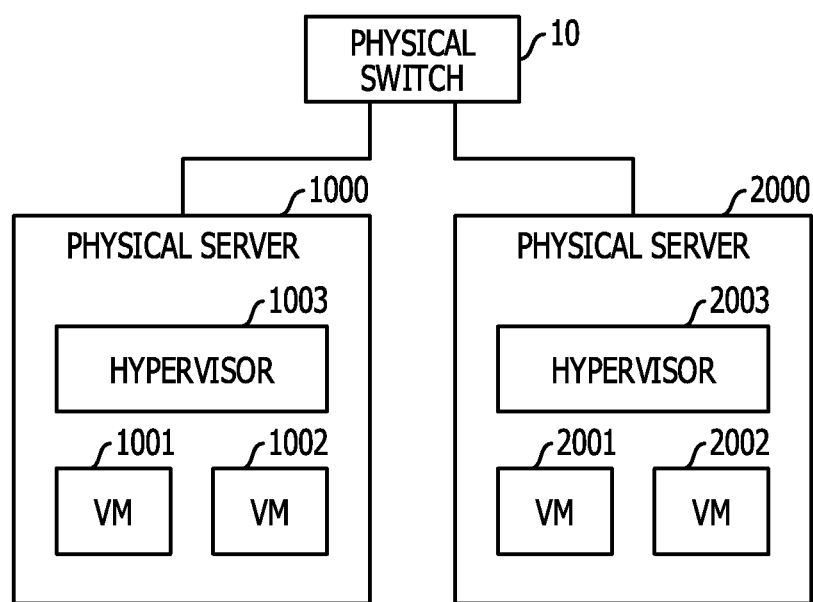
FIG. 3 illustrates an example of a system.
Figure 4:
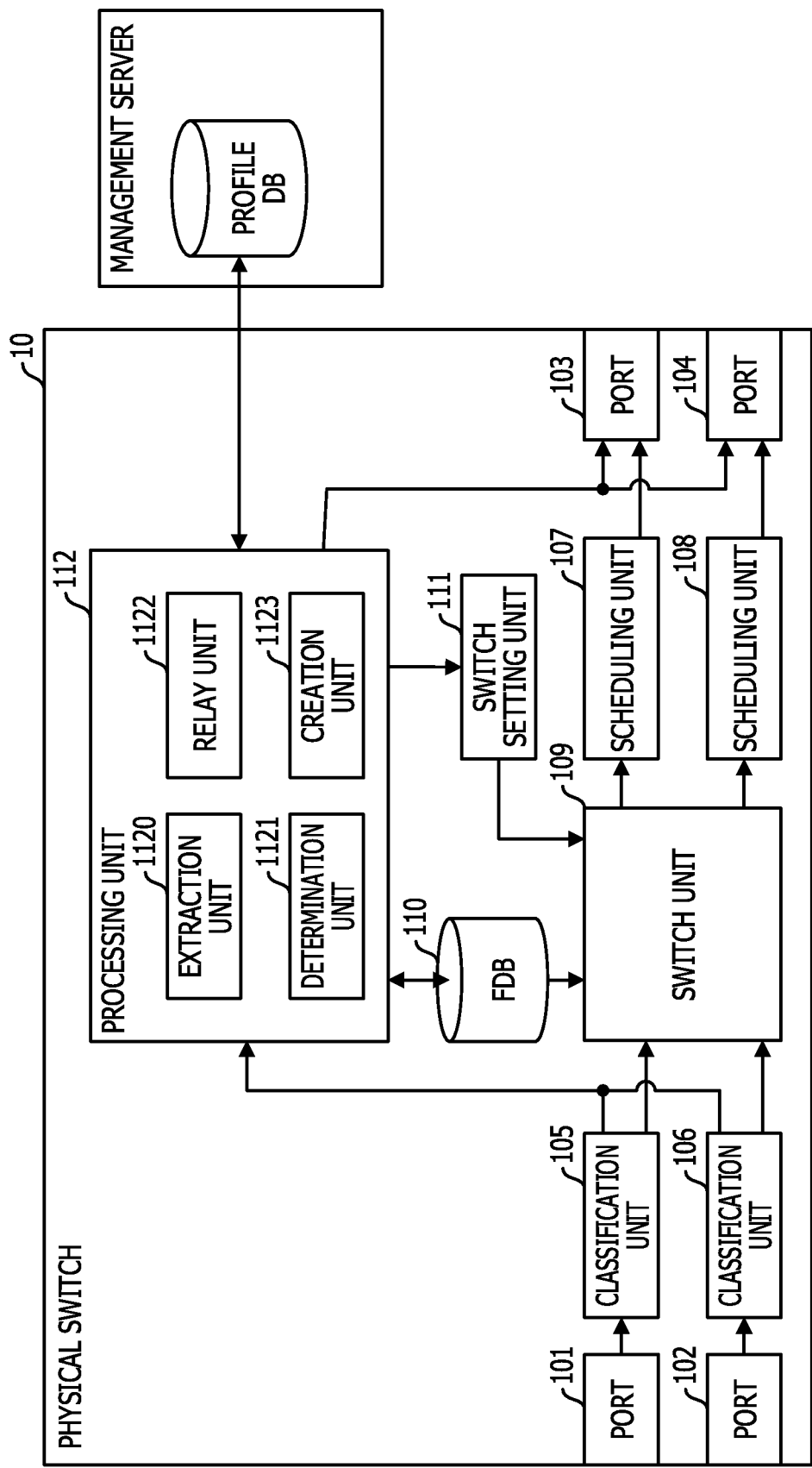
FIG. 4 is an example of a functional block diagram of a physical switch and a management server.

FIG. 3 illustrates an example of a system. The system illustrated in FIG. 3 includes a physical switch 10 and physical servers 1000 and 2000. The physical switch 10 is coupled with the physical server 1000 and the physical server 2000. The physical switch 10 is coupled with a management server 50 configured to manage a profile DB 51 which is illustrated in FIG. 4. The physical switch 10 may include the profile DB.

The physical server 1000 executes a hypervisor 1003 which is a program to execute a virtual machine in the physical server 1000. On the hypervisor 1003, the VM 1001 and the VM 1002 are executed. As similar to the physical server 1000, the physical server 2000 executes a hypervisor 2003. On the hypervisor 2003, VM 2001 and VM 2002 are executed.

FIG. 4 illustrates an example of a functional block diagram of a physical switch and a management server. FIG. 4 illustrates the functional block diagram of the physical switch 10 and the functional block diagram of the management server 50 coupled with the physical switch 10. The physical switch may be the physical switch illustrated in FIG. 3. The physical switch 10 includes ports 101 and 102, classification units 105 and 106, scheduling units 107 and 108, a switch unit 109, a forwarding database (FDB) 110, a switch setting unit 111, and a processing unit 112 including an extraction unit 1120, a determination unit 1121, a relay unit 1122, and a creation unit 1123. The processing unit 112 may include a processor or a central processing unit (CPU).

The port 101 outputs a received packet to the classification unit 105. Similarly, the port 102 outputs the received packet to the classification unit 106.

The classification unit 105 outputs the packet to the switch unit 109 and the processing unit 112 according to a certain access control list. Similarly, the classification unit 106 outputs the packet to the switch unit 109 and the processing unit 112 according to a certain access control list. For example, when the packet received from the VM is an address resolution protocol (ARP) request, the classification units 105 and 106 output packets to the switch unit 109 and output duplications of the packets to the processing unit 112. The packet may be an ARP request and may be a packet of a gratuitous ARP (GARP) or an ARP reply for the ARP request. In case of packets other than the ARP request, the classification units 105 and 106 output packets to the switch unit 109. The information which is used by the classification units 105 and 106 may be information other than the access control request.

The extraction unit 1120 extracts information which is used for creating a confirmation packet which is a packet to confirm if the VM is stopped (in other words, is in a stopped state) from the ARP request received from the classification units 105 and 106 and stores it in the profile DB 51.

The determination unit 1121 determines if the VM in a transmission destination of the confirmation packet is stopped based on if the response packet corresponding to the confirmation packet is received.

The relay unit 1122 transfers the ARP request to the VM in the stopped state. For example, when the VM having a target Internet protocol (IP) address in the ARP request is in the stopped state, the relay unit 1122 transfers the ARP request to that VM.

The creation unit 1123 regularly (for example, every 5 seconds) creates a confirmation packet using data stored in the profile DB 51, and outputs it to a port coupled to a physical server in which a VM in a transmission destination of a confirmation packet, for example, the VM in the transmission source of the ARP request is executed.

In response to an instruction from the processing unit 112, the switch setting unit 111 changes a port attribute value which is held by the switch unit 109, for example, VLAN information, quality of service (QoS) information or the like.

The switch unit 109 outputs a packet to the scheduling unit 107 and the scheduling unit 108 based on the attribute values of the ports, which are held by the switch unit 109 and the data stored in the FDB 110.

The scheduling unit 107 determines a packet transmission schedule and outputs the packet to be transmitted to the port 103. Similarly, the scheduling unit 108 determines the packet transmission schedule and output the packet to be transmitted to the port 104. The port 103 and the port 104 transmit the received packets to a device in a destination.

FIG. 5 illustrates an example of an access control list. In FIG. 5, conditions and rules including processing which is performed when the conditions are satisfied are registered. For example, a rule in which processing of "Copy to CPU" is performed when the destination media access control (MAC) address is "ff:ff:ff:ff:ff:ff", for example, a packet is a broadcast packet, and the Ether type is "0x0806", for example, a packet is an ARP request or a response to an ARP request, is registered. The "Copy to CPU" may mean that copy is performed to a central processing unit (CPU), for example, a processor which performs software processing on packets. For example, a duplication of the packet is output to the processing unit 112. "Don't Care" may mean that any value is applicable.

FIG. 6 illustrates an example of data in a profile DB. The profile DB 51 illustrated in FIG. 6 stores a VM MAC address, a profile ID, identification information of a port to which the profile is applied, a port state, information about a confirmation packet, an IP address corresponding to a MAC address, and a VLAN ID. When the state is "SUSPEND", the VM which is executed by the physical server coupled with the port is stopped. When the state is "ASSIGN", the VM is not stopped and the profile is set in the port. When the state is "NOT ASSIGN", the profile is not set in the port. When the information about the confirmation packet is "Enable", the transmission of the confirmation packet is valid. When the information about the confirmation packet is "Disable", the transmission of the confirmation packet is invalid. For example, the "profile" may mean setting information.

FIG. 7 illustrates an example of a value in an ARP request. FIG. 7 illustrates values which are set in the ARP request transmitted by a VM, for example, the VM 1. In FIG. 7, "ff:ff:ff:ff:ff:ff" is set as a destination MAC address, a MAC address of the VM 1 is set as a transmission source (source) MAC address, "0x8100" is set as a VLAN tag, the ID of a VLAN to which the VM 1 belongs is set as a VLAN ID, a MAC address of the VM 1 is set as a transmission source (sender) MAC address, an IP address of the VM 1 is set as the transmission IP address, "00:00:00:00:00:00" is set as a target MAC address, and an IP address which is an ARP target is set as a target IP address. The transmission source MAC address includes the transmission source (source) MAC address included in the MAC header and the transmission source (sender) MAC address included in the body of the ARP packet.

The extraction unit 1120 extracts the transmission source MAC address, the transmission source IP address, and the VLAN ID, and stores them in the profile DB 51. FIG. 8 illustrates an example of a value in a confirmation packet. For example, the creation unit 1123 creates a confirmation packet as illustrated in FIG. 8. A format of the confirmation packet illustrated in FIG. 8 may be a format of an ARP request. As the destination MAC address, the "MAC address of the VM 1" is set. As a transmission source (source) MAC address, the MAC address of the physical switch 10 is set. As a VLAN tag, "0x8100" is set. As a VLAN ID, the ID of a VLAN to which the VM 1 belongs is set. As a transmission source (sender) MAC address, "ff:ff:ff:ff:ff:ff" is set. As a target MAC address, "00:00:00:00:00:00" is set. As a transmission source IP address, "0.0.0.0" is set. As a target IP address, the IP address of the VM 1 is set.

When the VM is not stopped, the confirmation packet may be created in the format of the ARP request to respond to an operating system (OS) of the VM. For this reason, as illustrated in FIG. 7 and FIG. 8, as information which is used when the VM 1 responds to the ARP request, the VLAN ID of the VM 1 and the IP address of the VM1 are set. The MAC address of the VM 1 is set to reduce a case in which VM other than the VM 1 receives the confirmation packet.

Figure 9:
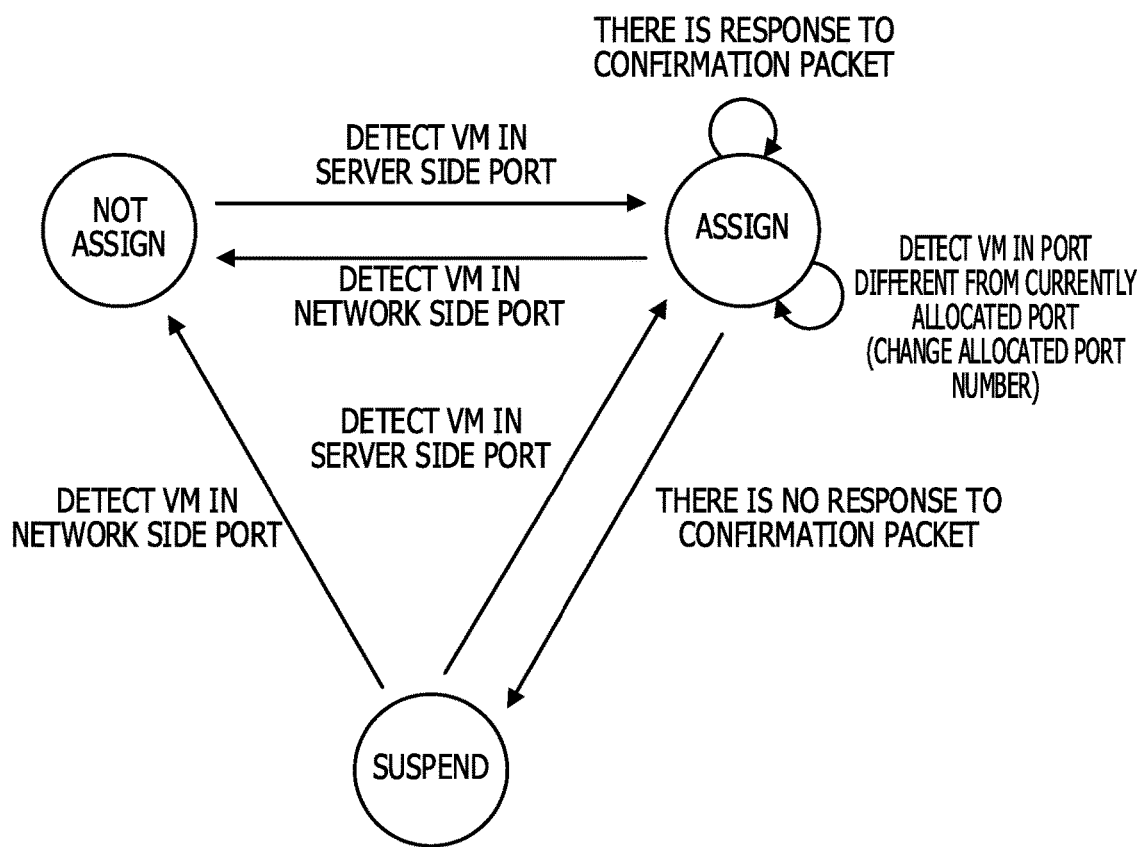
FIG. 9 illustrates an example of a port state transition.

FIG. 9 illustrates an example of a port state transition. FIG. 9 illustrates a state transition diagram about the port state which is managed by the extraction unit 1120. The states of the port may be any of the "ASSIGN", "NOT ASSIGN", or "SUSPEND". When the state is "ASSIGN", a profile is set in the port. When the state is "NOT ASSIGN", a profile is not set in the port. When the state is "SUSPEND", the VM is stopped.

As illustrated in FIG. 9, when the VM is detected in the network side port in a case where the state is "ASSIGN", the state transitions to "NOT ASSIGN". For example, in FIG. 3, the network side port may be a port which is not coupled with the physical server 1000 and the physical server 2000 and is coupled with an outside network. When a response to the confirmation packet does not exist in a case where the state is "ASSIGN", the state transitions to the "SUSPEND". When a response to the confirmation packet exists in a case where the state is "ASSIGN", the state remains "ASSIGN". When a VM is detected in other port which is different from the port to which a current profile is allocated in a case where the state is "ASSIGN", the state remains "ASSIGN". A port number to which the profile is allocated may be changed.

When the VM is detected in the server side port in a case where the state is "NOT ASSIGN", the state transitions to "ASSIGN". For example, in FIG. 3, the server side port may be a port which is coupled with the physical server 1000 and the physical server 2000.

When the VM is detected in the server side port in a case where the state is "SUSPEND", the state transitions to "ASSIGN". When the VM is detected in the network side port in a case where the state is "SUSPEND", the state transitions to "NOT ASSIGN".

In this manner, the physical switch 10 detects that the VM is in an inactive state. The inactive state includes a no-communication state, a stopped state, and a complete deletion state. The no-communication state may be a state where the VM is executed but communications are not performed. Since there is possibility for the VM to restart communications an any time, the setting for the port is not deleted. The stopped state may be a state where a VM instance is deleted from a memory of the physical server. There is a possibility of restarting again the communications which has been executed before, but it is unknown that the VM is going to be executed. For this reason, the setting for the port is deleted, but when the VM is executed again, the setting for the port is made again. The complete deletion state may be a state where a VM image is completely deleted from the physical server and not executed again.

A physical server, for example, the physical server 1000 may activate a VM, for example, the VM 1001.

Figure 10:
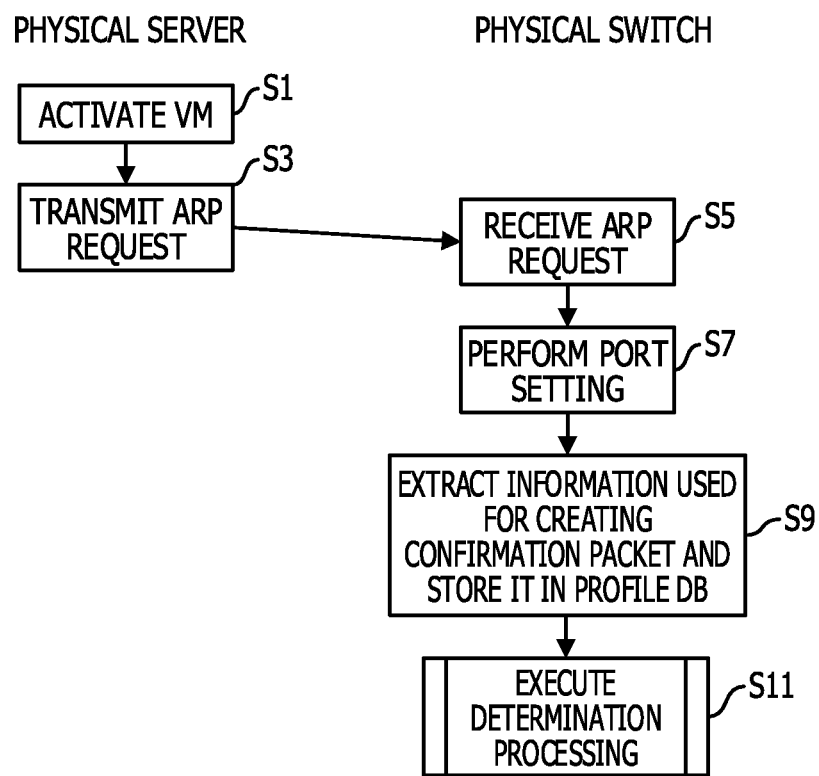
FIG. 10 illustrates an example of main processing.

FIG. 10 illustrates an example of main processing. The physical server 1000 activates the VM 1001 using a VM image or the like (FIG. 10: operation S1). After that, the VM 1001 transmits an ARP request to the physical switch 10 (operation S3).

A port of the physical switch 10, for example, the port 101 receives the ARP request from the physical server 1000 (operation S5). The port 101 outputs the received ARP request to the classification unit 105. The classification unit 105 determines if the ARP request received from the port 101 meets conditions registered in the access control list. For example, when it is determined that the conditions are met, a duplication of the ARP request is output to the processing unit 112.

The extraction unit 1120 in the processing unit 112 receives the ARP request from the classification unit 105. The extraction unit 1120 sets the port about the received ARP request (operation S7). For example, the extraction unit 1120 registers identification information of the port having received the ARP request and the transmission source MAC address included in the ARP request in association with each other in the FDB 110.

The extraction unit 1120 extracts the information (here, the VLAN ID, transmission source MAC address, and transmission source IP address) which is used for creating the confirmation packet from the received ARP request, and stores it in the profile DB 51 (operation S9). The extracted information may be stored in an entry about the transmission source VM of the ARP request in the profile DB 51. When the VM 1001 is a VM which is moved by the VM migration, the identification information of the port having received the ARP request may be different from the identification information of the port stored in the profile DB 51. In this case, the identification information of the port stored in the profile DB 51 is changed to the identification information of the port having received the ARP request.

Figure 11:
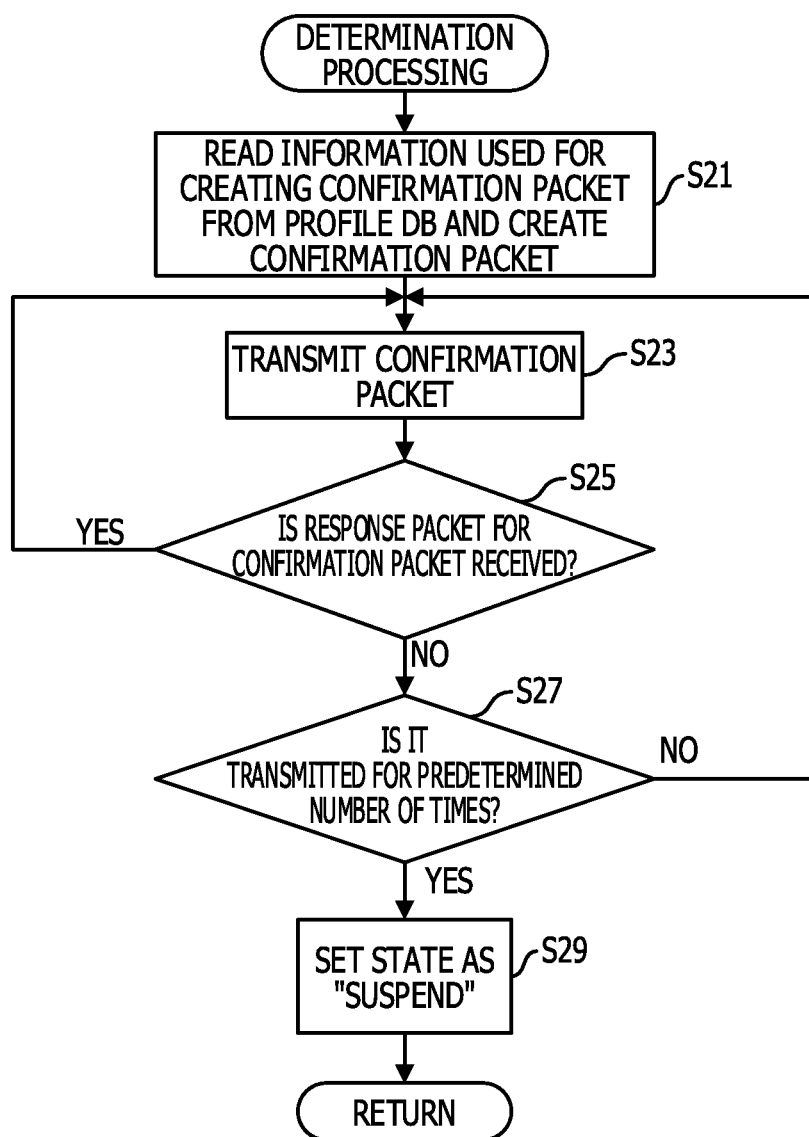
FIG. 11 illustrates an example of determination processing.

The determination unit 1121 executes the determination processing (operation S11). FIG. 11 illustrates an example of determination processing.

The determination unit 1121 outputs an instruction to create a confirmation packet to the creation unit 1123. In response to this, the creation unit 1123 reads information which is used for creating the confirmation packet from the profile DB 51 and creates a confirmation packet in a format of an ARP request (FIG. 11: operation S21). The creation unit 1123 transmits the confirmation packet to the port coupled to a physical server which executes the VM in a transmission source of the ARP request received at operation S5, for example, the VM 1001, for example, the physical server 1000 (operation S23).

The determination unit 1121 determines if a response packet for the confirmation packet transmitted at operation S23, for example, an ARP reply is received (operation S25). When the response packet for the confirmation packet is received (operation S25: Yes route), the processing returns to operation S23. When a certain time, for example, 30 seconds has passed since the processing of previous operation S23 is executed, operation S23 is executed.

On the other hand, when the response packet for the confirmation packet is not received (operation S25: No route), the determination unit 1121 determines if the confirmation packet is transmitted for a certain number of times, for example, 3 times (operation S27). When it is not transmitted for the certain number of times (operation S27: No route), the processing returns to operation S23. When a certain time, for example, 5 seconds, has passed since the processing of the previous operation S23 is executed, the processing of operation S23 is executed. On the other hand, when transmission is performed for the certain number of times (operation S27: Yes route), the determination unit 1121 sets the state of the profile entry for the VM 1001 of the profile DB 51 as "SUSPEND" (operation S29). The processing returns to caller processing. When the state is set as "SUSPEND", the switch unit 109 deletes the filter setting and quality of service (QoS) setting from the viewpoint of effective use of resources and security.

Figure 12:
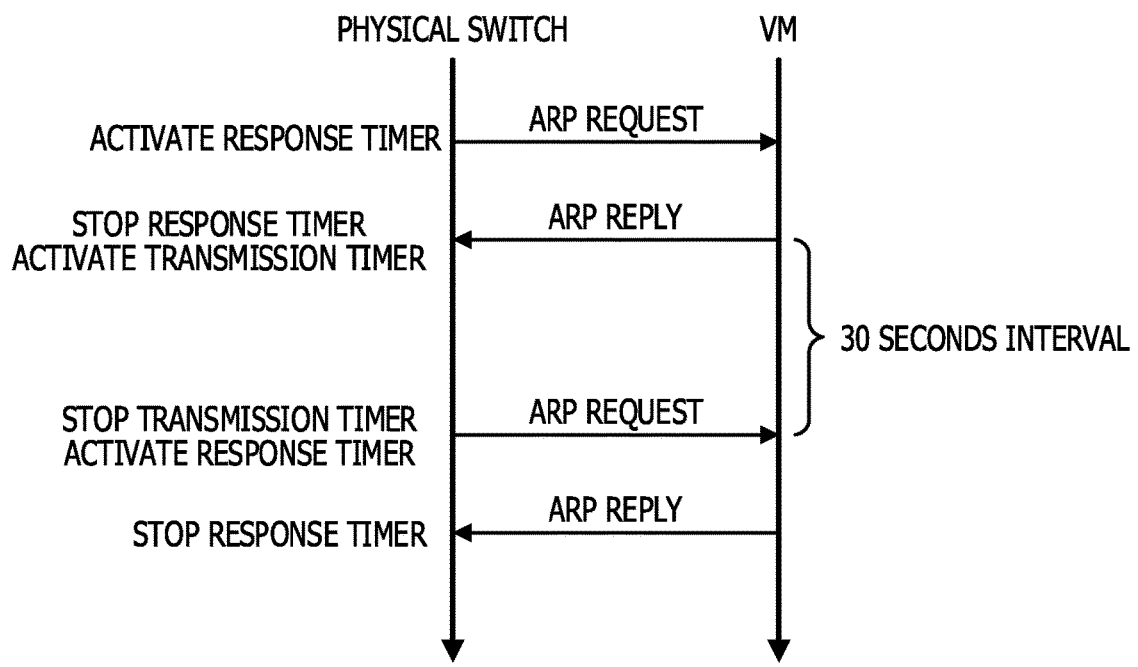
FIG. 12 illustrates an example of determination processing.

FIG. 12 illustrates an example of determination processing. FIG. 12 illustrates a sequence diagram of determination processing when a VM is running. In FIG. 12, a response timer may be a timer for a time period until an ARP reply has been received since a confirmation packet is transmitted. The time period by timeout may be 5 seconds. The transmission timer may be a timer for the time period until a next ARP request (for example, a confirmation packet) is transmitted after the ARP reply is received. The time period by the timeout may be 30 seconds, for example.

As illustrated in FIG. 12, the physical switch 10 activates a response timer when an ARP request is transmitted to a VM, for example, the VM 1001. When the ARP reply is received before the response timer times out, the physical switch 10 stops the response timer and activates a transmission timer.

When the transmission timer times out, the physical switch 10 stops the transmission timer and transmits an ARP request. The physical switch 10 activates a response timer. When an ARP reply is received before the response timer times out, the physical switch 10 stops the response timer and activates the transmission timer.

Figure 13:
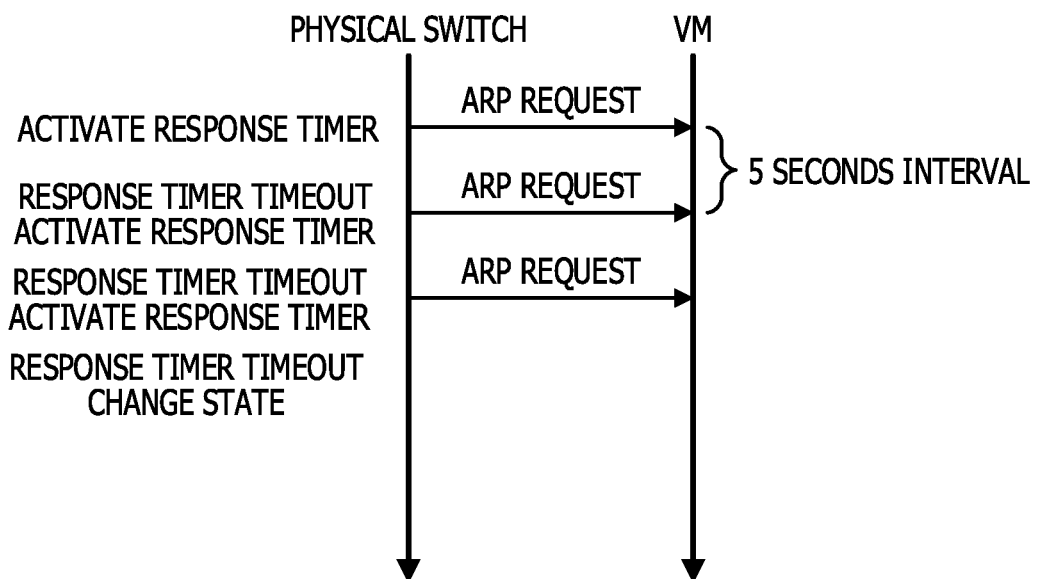
FIG. 13 illustrates an example of determination processing.

FIG. 13 illustrates an example of determination processing. FIG. 13 illustrates a sequence diagram of determination processing when the VM is stopped.

As illustrated in FIG. 13, the physical switch 10 activates the response timer when an ARP request is transmitted to a VM, for example, the VM 1001. When the ARP reply is not received before the response timer times out, the physical switch 10 transmits the ARP request to the VM 1001 and activates the response timer. When an ARP reply is not received before the response timer times out, the physical switch 10 transmits the ARP request to the VM 1001 and activates the response timer.

When the ARP reply is not received before the response timer times out and the ARP request has been already received for the certain number of times, for example, three times, the physical switch 10 sets the state of the VM in the profile DB 51 as "SUSPEND".

With the processing as described above, it is detected that the virtual machine is in an inactive state. For example, when a state of a VM is detected by a VSI discovery and configuration protocol (VDP), virtualized software of the physical server 1000, for example, a hypervisor or the like, may support VDP and the virtualized software may not support the VDP. For this reason, even when multiple kinds of visualized software are used in the system, the processing as described above may be applied.

When the VM is in the stopped state (which mean "SUSPEND"), unnecessary setting is deleted. Accordingly, a possibility of transmitting packets to a port which is not appropriate for the packets to be transmitted is reduced, so that security may be improved. Since the unnecessary setting is deleted, the network bandwidths and resources of the physical switch (for example, a processor) may be effectively utilized.

Figure 14:
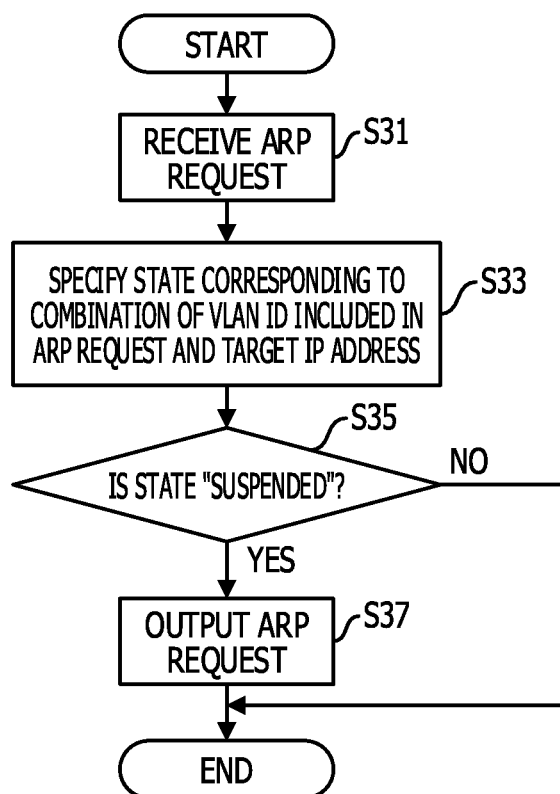
FIG. 14 illustrates an example of relay processing.
Figure 15:
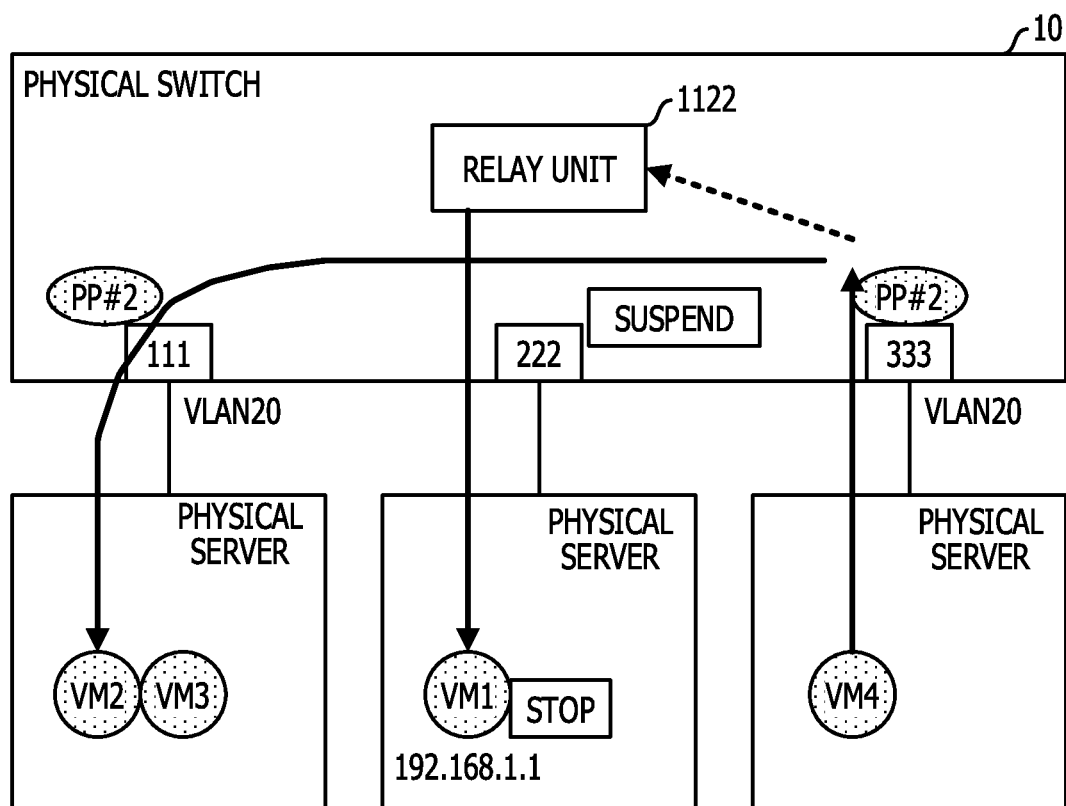
FIG. 15 illustrates an example of relay processing.

FIG. 14 to FIG. 16 illustrate an example of relay processing. FIG. 14 to FIG. 16 illustrate processing of relaying an ARP request to the VM in the stopped state.

A port of the physical switch 10, for example, the port 101, receives an ARP request from a physical server, for example, the physical server 1000 (FIG. 14: operation S31). The port 101 outputs the received ARP request to the classification unit 105. The classification unit 105 determines if the ARP request received from the port 101 meets the conditions registered in the access control list. For example, when it is determined that the conditions are met, a duplication of the ARP request is output to the processing unit 112.

The relay unit 1122 in the processing unit 112 receives the ARP request from the classification unit 105. The relay unit 1122 specifies the state corresponding to the combination of the VLAN ID and the target IP address which are included in the received ARP request, from the profile DB 51 (operation S33). When there is no entry about the state corresponding to the combination of the VLAN ID and the target IP address, the processing is terminated.

The relay unit 1122 determines if the state specified at operation S33 is "SUSPEND" (operation S35). When the state is not "SUSPEND" (operation S35: No route), the relay unit 1122 terminates the processing without relaying the ARP request.

On the other hand, when the state is "SUSPEND" (operation S35: Yes route), the relay unit 1122 specifies the identification information of the port from the entry including the combination of the VLAN ID and the target IP address which are included in the received ARP request and outputs the ARP request to the port indicated by the specified identification information (operation S37). The processing is terminated.

When the state is "ASSIGN", the ARP request is relayed by the processing performed by the switch unit 109 and when the state is "SUSPEND", the ARP request is relayed by the processing performed by the relay unit 1122. For this reason, when the VM in the stopped state is executed again, communications quickly start without waiting for packets of ARP or reverse address resolution protocol (RARP) which are transmitted from the VM.

For example, in the system illustrated in FIG. 15, a physical server is coupled with each of the port 111, port 222, and port 333 of the physical switch 10. The setting whose identification number is 2 (pp#2) is applied to the port 111, and the setting whose identification number is 2 (pp#2) is applied to the port 333. The physical server coupled with the port 111 executes the VM 2 and VM 3, the physical server coupled with the port 222 executes the VM 1, and the physical server coupled with the port 333 executes the VM 4. In FIG. 15, VMs given of the same pattern may belong to the same VLAN. The VMs 1 to 4 belong the VLAN 20, but the VM 1 is in the stopped state and the profile of the port 222 is deleted. Accordingly, there is a possibility that the switch unit 109 does not relay the packets to the VM 1.

FIG. 16 illustrates data stored in the profile DB 51 in the system illustrated in FIG. 15. It is registered in FIG. 15 that the VLAN ID of profile (pp#1) which is applied to the port 222 is "20" and the IP address of the VM 1 which is executed by the physical server coupled with the port 222 is "192.168.1.1". Since the VM 1 is in the stopped state and the profile of the port 222 is deleted, the switch unit 109 does not relay the packets to the VM 1.

For example, as for the ARP request, the relay is performed as follows. As illustrated in FIG. 15, the VM 4 transmits the ARP request whose target IP address is "192.168.1.1" to the physical switch 10. The ARP request is output from the port 111 by the processing of the switch unit 109 and reaches at the VM 2 and VM 3.

On the other hand, the duplication of this ARP request is output to the relay unit 1122. The relay unit 1122 outputs the ARP request from the port 222 with the processing of operation S37. For this reason, the physical server executing the VM 1 receives the ARP request.

The FDB has a function to delete an entry of the MAC address in which communications are not performed for a certain period of time. The determination processing may be executed using this function. FIG. 17 illustrates an example of data in a FDB. For example, the FDB 110 illustrated in FIG. 17 is used. In FIG. 17, stored are a memory address, a VLAN ID, a MAC address, a port vector, a value indicating a time period until a timer times out, a remaining number of times, and information on a state of a confirmation packet. The port vector is information expressing a relay destination port corresponding to the MAC address.

An FDB management unit may be provided. When there is no communication for a certain period of time, for example, when it times out, the FDB management unit causes the processing unit 112 to transmit the confirmation packet and changes the state of the confirmation packet to "PROBING". When the state of the confirmation packet is "PROBING", it means that the timer is "waiting for a response". When it times out in this state, the FDB management unit causes the processing unit 112 to retransmit the confirmation packet and decrements "remaining number of times" in the FDB 110 by one time. When the "remaining number of times" becomes 0, the FDB management unit changes the state of the confirmation packet to "Disable". When communications occur, the FDB management unit learns the MAC address and changes the state of the confirmation packet to "ACTIVE". In the FDB, the entry in which a specific period of time has passed since it is created is deleted and the profile of the port is also deleted.

By utilizing the fact that the entry of the FDB is deleted after a certain period of time has passed, processing may be effectively performed. As compared with the processing illustrated in FIG. 3, the confirmation packet is transmitted even when the VM becomes an inactive state, so that the number of times in which the confirmation packet is transmitted may be reduced.

The FDB 110 may be extended and a management table other than the FDB 110 may be prepared.

Figure 18:
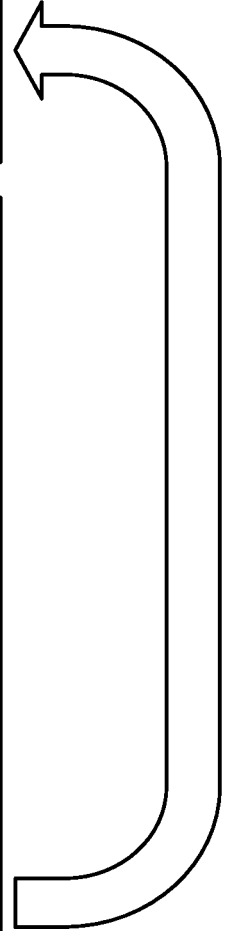
FIG. 18 illustrates an example of data in an FDB and data in a management table.

FIG. 18 illustrates an example of data in a FDB and data in a management table. As illustrated on the left side of FIG. 18, the FDB 110 stores a memory address, a VLAN ID, a MAC address, and a port vector. As illustrated on the right side of FIG. 18, the management table stores a memory address, a value indicating a time period until a timer times out, a remaining number of times, and information for a state of a confirmation packet.

In FIG. 18, the FDB 110, the management table, and the FDB management unit are utilized. When it times out or when an ARP request is received, the FDB management unit specifies the memory address from the entry including the MAC address relating to the timeout or the ARP request and specifies the entry corresponding to the specified memory address from the management table. For this reason, in FIG. 18, processing substantially same or similar to the processing illustrated in FIG. 17 may be performed.

For example, there is a possibility that the functional block diagram of the physical switch 10 may not be substantially the same as the actual program module configuration.

The above-described configuration of each table is an example and other configuration may be adopted. In the processing flow, as long as a processing result is not changed, the order of the processing may be switched or the processing may be performed in parallel.

The information may be extracted from the ARP request or the information may be acquired by inquiring the software managing the VM when the RARP packet is received.

Figure 19:
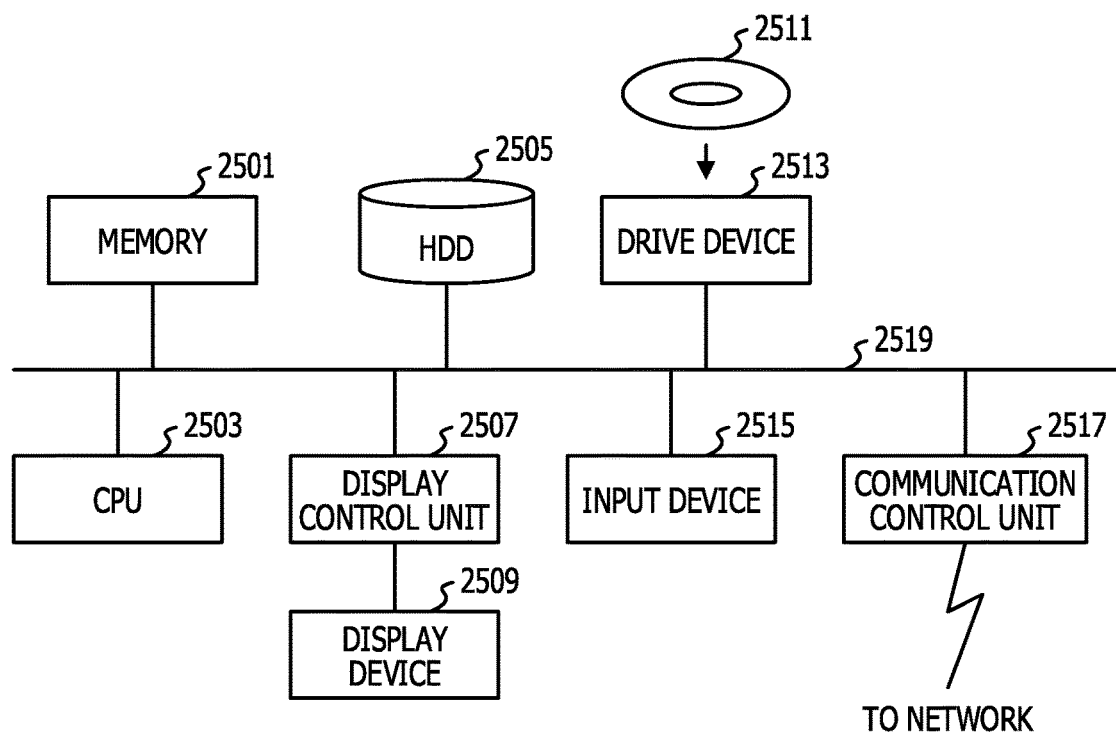
FIG. 19 illustrates an example functional block diagram of a computer.

FIG. 19 illustrates an example of a functional block diagram of a computer. The physical servers 1000 and 2000 may be a computer apparatus. As illustrated in FIG. 19, a memory 2501, a central processing unit (CPU) 2503, a hard disk drive (HDD) 2505, a display control unit 2507 coupled with a display device 2509, a drive device 2513 for a removable disk 2511, an input device 2515, and a communication control unit 2517 for coupling a network, are coupled through a bus 2519. An operating system (OS) and an application program implementing the above-described processing are stored in the HDD 2505, and when executed by the CPU 2503, they are read from the HDD 2505 to the memory 2501. According to the processing contents of the application program, the CPU 2503 controls the display control unit 2507, the communication control unit 2517, and the drive device 2513 to perform a certain operation. The data in process may be stored in the memory 2501 and may be stored in the HDD 2505. The application program for implementing the above processing may be stored in the computer readable removable disk 2511 and distributed and installed from the drive device 2513 to the HDD 2505. The application program may be installed to the HDD 2505 through the network such as the Internet and the communication control unit 2517. In the computer apparatus, hardware such as the above-described CPU 2503 and the memory 2501 and the programs such as the OS and the application program organically cooperate with each other to execute the above-described various kinds of functions.

It may be detected that a virtual machine executed by an information processing device coupled with a network switch is stopped.

A request packet may be a request packet of an address resolution protocol (ARP). First information may include an IP address of the first virtual machine, a MAC address of the first virtual machine, and identification information of a virtual network to which the first virtual machine belongs. The transmission unit may set the IP address of the first virtual machine in the target IP address of the request packet, set the MAC address of the first virtual machine in the destination address of the confirmation packet, and set the identification information of the virtual network to which the first virtual machine belongs in the identification information of the virtual network of the confirmation packet. By using the ARP, unlike VDP, a case where a network switch is coupled in a multiple stages may be handled.

When it is determined that the first virtual machine is stopped, the determination unit may set stopping the relay of a packet other than the request packet to the first virtual machine. Since the information processing device executing the stopped virtual machine does not receive packets other than the request packet, security may be improved. The number of packets to be relayed may be reduced. For this reason, processing load of the network switch may be reduced and unnecessary consumption of the bandwidth may be reduced. When an operation of the stopped virtual machine is restarted, a response to the request packet is transmitted. Accordingly, communications may be started immediately.

A packet which is transmitted by the first virtual machine which is executed by a first information processing device coupled with a network switch to a second virtual machine which is executed by a second information processing device coupled with the network switch may include an ARP request packet, a request packet of gratuitous ARP (GARP), or a response packet for the ARP request packet from the second virtual machine. By using the ARP, a case where virtual software of the information processing device, for example, hypervisor, does not support the VDP may be handled.

A program causing a computer to perform the above processing may be created. The program may be stored in a computer readable storage medium or storage device, such as a flexible disk, a CD-ROM, a magneto-optical disk, a semiconductor memory, or a hard disk. An intermediate processing result may be temporarily stored in the storage device such as a memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network switch, comprising:
   a receiving terminal configured to receive a packet from one of a first information processing device and a second information processing device;
   a memory configured to store a program; and
   a processor configured to process the packet, wherein the processor performs, based on the program, operations of:
   extracting first information which is used for creating a request packet requesting a response of a first virtual machine executed by the first information processing device from the packet which is transmitted by the first virtual machine to a second virtual machine executed by the second information processing device;
   creating the request packet using the first information;
   transmitting the request packet to the first virtual machine;
   determining an operation state of the first virtual machine based on if a response packet for the request packet is received from the first virtual machine; and
   performing, when the operation state of the first virtual machine is determined to be in a stopped state, a setting for stopping relay of a packet other than the request packet to the first virtual machine; and
   transmitting a new request packet to the first virtual machine when a first period of time elapses after receiving the response with respect to the request packet transmitted previously and when a second period of time elapses in a case where a transmission of the request packet is not performed a number of times after not receiving the response with respect to the request packet previously transmitted, wherein the first period of time is longer than the second period of time.

2. The network switch according to claim 1, wherein the request packet is an address resolution protocol (ARP) request packet.

3. The network switch according to claim 2, wherein the first information includes an IP address of the first virtual machine, a MAC address of the first virtual machine, and identification information of a virtual network to which the first virtual machine belongs.

4. The network switch according to claim 3, wherein the operations include:
   setting the IP address of the first virtual machine as a target IP address of the request packet;
   setting the MAC address of the first virtual machine as a destination address of the request packet; and
   setting the identification information of the virtual network as identification information of a virtual network of the request packet.

5. The network switch according to claim 1, wherein the packet which is transmitted by the first virtual machine to the second virtual machine includes an address resolution protocol (ARP) request packet, a gratuitous address resolution protocol (GARP) request packet or a response packet for an address resolution protocol (ARP) request packet from the second virtual machine.

6. A network system, comprising:
   a processor provided in a network switch coupled to first and second information processing devices; and
   a memory configured to store a program,
   wherein the processor performs, based on the program, operations including:
   extracting first information which is used for creating a request packet requesting a response of a first virtual machine executed by the first information processing device from the packet which is transmitted by the first virtual machine to a second virtual machine executed by the second information processing device;
   creating the request packet using the first information;
   transmitting the request packet to the first virtual machine;

determining an operation state of the first virtual machine based on if a response packet for the request packet is received from the first virtual machine; and performing, when the operation state of the first virtual machine is determined to be in a stopped state, a setting for stopping relay of a packet other than the request packet to the first virtual machine; and transmitting a new request packet to the first virtual machine when a first period of time elapses after receiving the response with respect to the request packet transmitted previously and when a second period of time elapses in a case where a transmission of the request packet is not performed a number of times after not receiving the response with respect to the request packet previously transmitted, wherein the first period of time is longer than the second period of time.

7. The network system according to claim 6, wherein the processor stores the first information in a database in the memory.

8. The network system according to claim 6, wherein the request packet is an address resolution protocol (ARP) request packet.

9. The network system according to claim 8, wherein the first information includes an IP address of the first virtual machine, a MAC address of the first virtual machine, and identification information of a virtual network to which the first virtual machine belongs.

10. The network system according to claim 9, wherein the operations include:
setting the IP address of the first virtual machine as a target IP address of the request packet;
setting the MAC address of the first virtual machine as a destination address of the request packet; and
setting the identification information of the virtual network t as identification information of a virtual network of the request packet.

11. The network switch according to claim 6, wherein the packet which is transmitted by the first virtual machine to the second virtual machine includes an address resolution protocol (ARP) request packet, a gratuitous address resolution protocol (GARP) request packet or a response packet for an address resolution protocol (ARP) request packet from the second virtual machine.

12. A network control method, comprising:
extracting first information which is used for creating a request packet requesting a response of a first virtual machine executed by a first information processing device coupled with a network switch in a network system from a packet transmitted by the first virtual machine to a second virtual machine executed by a second information processing device coupled with the network switch;
creating the request packet using the extracted first information and transmitting the request packet to the first virtual machine;
determining an operation state of the first virtual machine based on if a response packet for the request packet is received from the first virtual machine;
performing, when the operation state of the first virtual machine is determined to be in a stopped state, a setting for stopping relay of a packet other than the request packet to the first virtual machine; and
transmitting a new request packet to the first virtual machine when a first period of time elapses after receiving the response with respect to the request packet transmitted previously and when a second period of time elapses in a case where a transmission of the request packet is not performed a number of times after not receiving the response with respect to the request packet previously transmitted, wherein the first period of time is longer than the second period of time.

13. The network control method according to claim 12, wherein the request packet is an address resolution protocol (ARP) request packet.

14. The network control method according to claim 13, wherein the first information includes an IP address of the first virtual machine, a MAC address of the first virtual machine, and identification information of a virtual network to which the first virtual machine belongs.

15. The network control method according to claim 14, wherein the operations include:
setting the IP address of the first virtual machine as a target IP address of the request packet;
setting the MAC address of the first virtual machine as a destination address of the request packet; and
setting the identification information of the virtual network t as identification information of a virtual network of the request packet.

16. The network control method according to claim 12, wherein the packet which is transmitted by the first virtual machine to the second virtual machine includes an address resolution protocol (ARP) request packet, a gratuitous address resolution protocol (GARP) request packet or a response packet for an address resolution protocol (ARP) request packet from the second virtual machine.

* * * * *